United States Patent [19]

Vollmer et al.

[11] Patent Number: 4,532,830

[45] Date of Patent: Aug. 6, 1985

[54] SAWTOOTH GRINDING MACHINE

[76] Inventors: Erwin H. Vollmer, Jahnstr. 4, D-7242 Dornhan; Manfred Glatthaar, Ignaz-Rohr-Str. 24, D-7328 Hochmössingen, both of Fed. Rep. of Germany

[21] Appl. No.: 574,671

[22] Filed: Jan. 27, 1984

[30] Foreign Application Priority Data

Jan. 29, 1983 [DE] Fed. Rep. of Germany ....... 3303075

[51] Int. Cl.³ .............................................. B23D 63/12
[52] U.S. Cl. .......................................... 76/45; 51/225; 76/40; 76/41
[58] Field of Search .................... 51/225, 3; 76/37, 40, 76/41, 42, 43, 45

[56] References Cited

U.S. PATENT DOCUMENTS

| 271,634 | 2/1883 | Hoffman | 76/45 |
| 1,217,889 | 2/1917 | Brust | 76/45 |
| 4,357,841 | 11/1982 | Mote | 76/41 |
| 4,436,000 | 3/1984 | Lenard et al. | 76/37 |

Primary Examiner—Roscoe V. Parker
Attorney, Agent, or Firm—Toren, McGeady, Stanger, Goldberg & Kiel

[57] ABSTRACT

A sawtooth grinding machine has a single pivotally mounted grinding head for grinding both the face and back of teeth, such as in a circular saw blade. The grinding wheel is a composite member formed of a disk wheel and a cup wheel. The disk wheel is shaped to fit into narrow gaps between teeth when grinding the face of a tooth. The cup wheel has a smaller diameter than the disk wheel and has an abrasion-coated ring on its outer circumference for grinding the back of a tooth. A spindle shaft mounts the grinding wheel on the grinding head. The angular displacement of the grinding head for different grinding positions can be reduced as compared to known arrangements. The grinding head is supported for translatory movement in two directions extending perpendicularly of one another and also for rotation about two axes disposed at right angles to one another.

9 Claims, 4 Drawing Figures

SAWTOOTH GRINDING MACHINE

SUMMARY OF THE INVENTION

The present invention is directed to a sawtooth grinding machine for grinding the teeth in a saw blade, particularly teeth with hard-metal inserts. The grinding machine has a single grinding head mounted for pivotal movement about several axes and also capable of translatory movement in several directions. The grinding head mounts a member for grinding both the face and back of a sawtooth.

In the past it has been known initially to surface-grind the face areas of all teeth in a circular saw blade and then to grind the back areas of the teeth using a single grinding wheel. It has also been known first to finish-grind the face area and the back area of each individual tooth before the workpiece is advanced for grinding the next tooth. In one known machine for carrying out the second method above, two separate grinding heads were used each with a grinding wheel. One grinding wheel performed the surface grinding of the tooth face while the other wheel effected the surface-grinding of the back of the tooth and the movement cycles for the two grinding heads were mutually correlated by a control. Further, for the finish-grinding of the face and back of each individual tooth, it has been known to arrange two grinding wheels in a "tandem" arrangement on a common movable support. It has also been known by the applicant that the grinding can be effected with a single grinding wheel and, therefore, a single grinding head located on a movable support so that the face area of each tooth is ground using the side face of the grinding wheel or by using cutting elements arranged on the side face and grinding the back of each tooth using the circumference of the same grinding wheel or cutting elements arranged on its circumference. The present invention is directed to overcoming a problem experienced in this last mentioned grinding arrangement. Since the grinding operation is effected not only with the surface but also the circumference of a single wheel, such a wheel has to have a certain minimum axial dimension at the circumference, especially if the grinding surface has a diamond or borazon coating. Because of the axial dimension at its circumference, the grinding wheel could not be inserted into particularly narrow gaps between closely set teeth when the face of a tooth is being ground.

Therefore, the primary object of the present invention is to provide a grinding member mounted in a single grinding head so that the face of a tooth can be surface-ground even when there are very narrow distances between the teeth and with the same member a coating, such as a diamond coating, suitable for grinding hard metal inserts in teeth, can be arranged on a sufficiently axially extending circumference of the member for grinding the back of a tooth. The manner in which the grinding member or wheel is arranged on the single grinding head assures that the pivot angle of the grinding head can be kept to a minimum and the weight of the head can also be kept low.

In accordance with the present invention, in a sawtooth grinding machine as mentioned above, two grinding wheels, suitable for grinding hard metal, such as diamond or borazon wheels are secured or clamped together on a spindle in a cantilevered arrangement so that the two wheels form a composite wheel. One of the grinding wheels is a disk wheel having a disk face or side and an opposite backside where the backside tapers to the outside circumference of the wheel toward the disk side for limiting the axial dimension of the disk wheel at its radially outer circumference so that it can be inserted into narrow tooth gaps for grinding the face of a tooth. The disk side of the grinding wheel is provided with an abrasive coating extending around its radially outer circumference. The second wheel of the composite grinding wheel is secured to the disk wheel and is used for grinding the back of a tooth. The second wheel is a cup wheel and its radially outer circumference has a smaller diameter than the radially outer circumference of the disk wheel. The radially outer circumference of the cup wheel is provided with an abrasive ring axially spaced from the first or disk wheel.

By using a composite wheel formed of two different wheels, one of which is a disk wheel for grinding the face of a tooth, there is the advantage that the first or disk wheel can be tapered on one side in the direction toward its outer circumferential edge so that its axial dimension is such that it can fit into even the narrowest tooth gap. With respect to its shape and the application of an abrasive coating suitable for grinding hard metal inserts, where the abrasive may be a diamond coating, the necessity for grinding the back of the tooth is no longer a disturbing factor. Grinding the back of the tooth can be effected by the second member of the composite wheel so that the second member can be arranged for carrying out the desired purpose unaffected by the requirements for grinding the face of the tooth. The second member of the composite wheel is a cup wheel and its outer circumferential diameter is smaller than the outer circumferential diameter of the disk wheel used for grinding the face of a tooth, so that the second wheel does not have to engage into a tooth gap. Following the grinding of the face of a tooth, by appropriately pivoting the grinding head, the second wheel can be used for surface grinding the back of a tooth. In the prior art where a single wheel was used to surface grind both the face and the back of a tooth, it was necessary to pivot the grinding head through as much as 270°. Since the back of a tooth can be ground with the second wheel of the composite wheel, considering the surface which grinds the face of a tooth as the front side of the composite unit, then the backside of the composite wheel is used for grinding the back of a tooth. Accordingly, it is sufficient to pivot the grinding head through only about 100° to move it from its end position for grinding the face of a tooth into its other end position for grinding the back of a tooth. With such reduced pivoting, less time is required in changing position and the cost of the grinding operation is reduced because of the shorter paths travelled.

With the reduced pivoting action achieved in the present invention, it does not pay to finish-grind each tooth individually, so that first the face areas of all the teeth are ground and then the backs of the teeth or, the operations can be reversed.

In one embodiment of the invention, a wheel flange is secured onto a spindle shaft so that it rotates with the shaft. The disk side of the first or disk-grinding wheel has a center bore which fits over a collar on the wheel flange. The backside of the cup wheel is placed against the backside of the disk wheel on the wheel flange so that the grinding surfaces are located at the opposite ends of the composite wheel. Both the first and second wheels are clamped against the wheel flange by a clamping ring screwed onto a threaded shoulder of the wheel flange and the wheels are secured against rotation relative to the flange by a locking pin.

One feature of the invention is that the composite wheel can be moved into all of the positions required for grinding the face and back of a tooth including forming any bevels, even for surfaces inclined to the plane of the saw blade by providing translatory movements of the grinding head along two intersecting directions and also by pivoting the grinding head about two axes crossing at right angles, as long as the translatory directions and the axes are properly selected. The need for translatory movement in a third direction extending normally of the other two translatory directions can be dispensed with affording a corresponding reduction in the cost of the machine. There is no need for a mere height displacement of the grinding wheel relative to the saw blade plane. Accordingly, the translatory movement can be performed in a direction crossing the spindle axis at right angles and in a direction parallel to the grinding wheel axis and the pivoting action can also be effected about two perpendicularly arranged axes both of which cross the grinding wheel axis at right angles.

In a known model, as mentioned above, for which the present invention affords improvement, it had been known to arrange the grinding head and its supporting members affording translatory and pivoting movement on a mounting plate inclined in a desk-like manner. In this known arrangement, the grinding unit was located close to the upper horizontal edge of the mounting plate, because for special reasons the uppermost tooth of a circular saw blade was always to be ground. In accordance with the present invention, the grinding unit including the composite wheel and the saw blade can be arranged on the mounting plate so that the pivot axis of the grinding unit and the mandrel for the saw blade lie along a line running on the mounting plate at an angle of 45° to the horizontal, that is, so that the grinding unit is located on the upper corner of the mounting plate and the circular saw blade is positioned diagonally below it with regard to the opposite lower corner of the plate. The overall arrangement is then of a lesser height than if the uppermost tooth is to be ground and of a lesser width if the tooth of the saw blade furthest to the side is to be ground.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
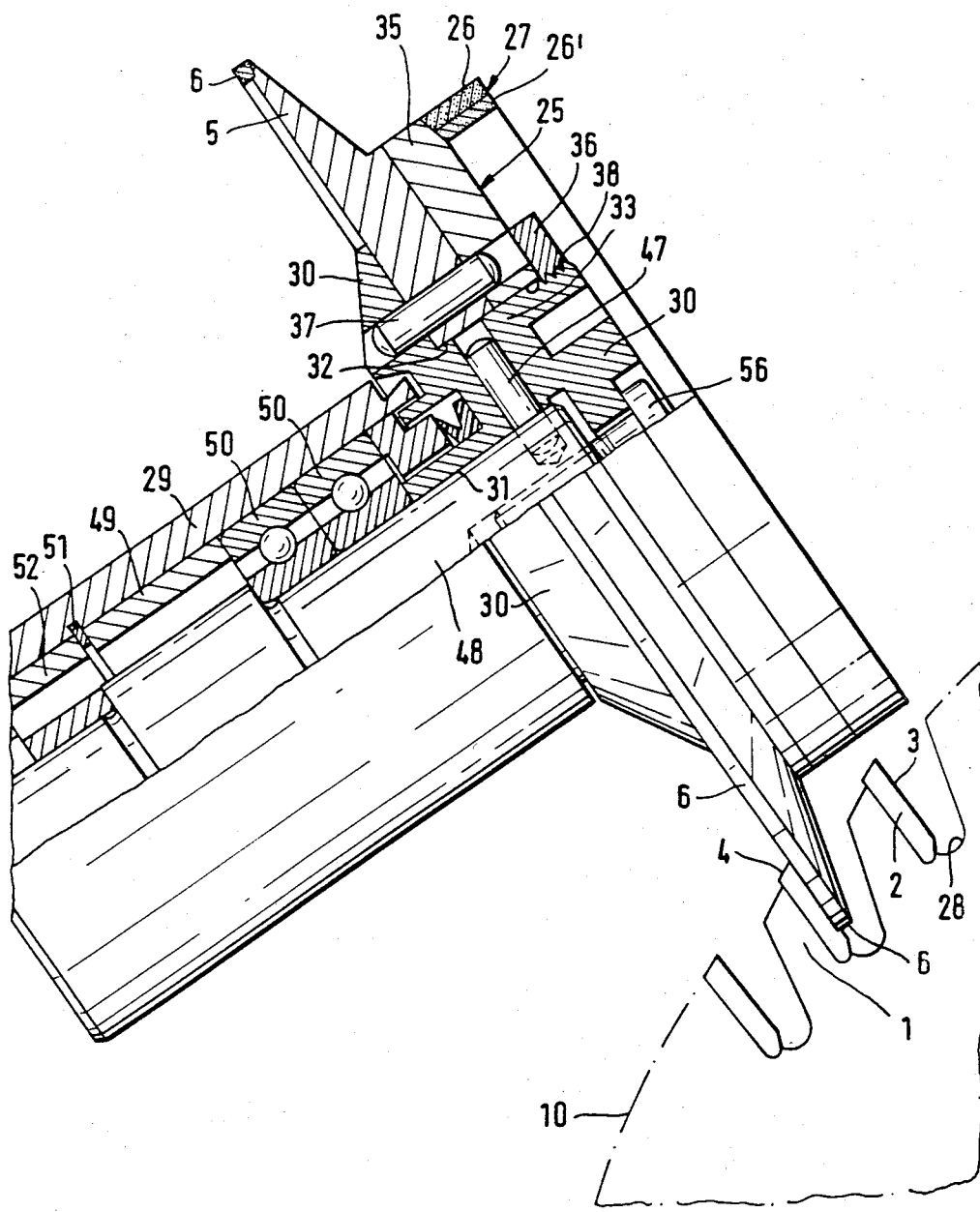
FIG. 1 is a schematic view of the grinding head supporting the composite wheel embodying the present invention, with the wheel being in position for grinding the face of a tooth.
Figure 2:
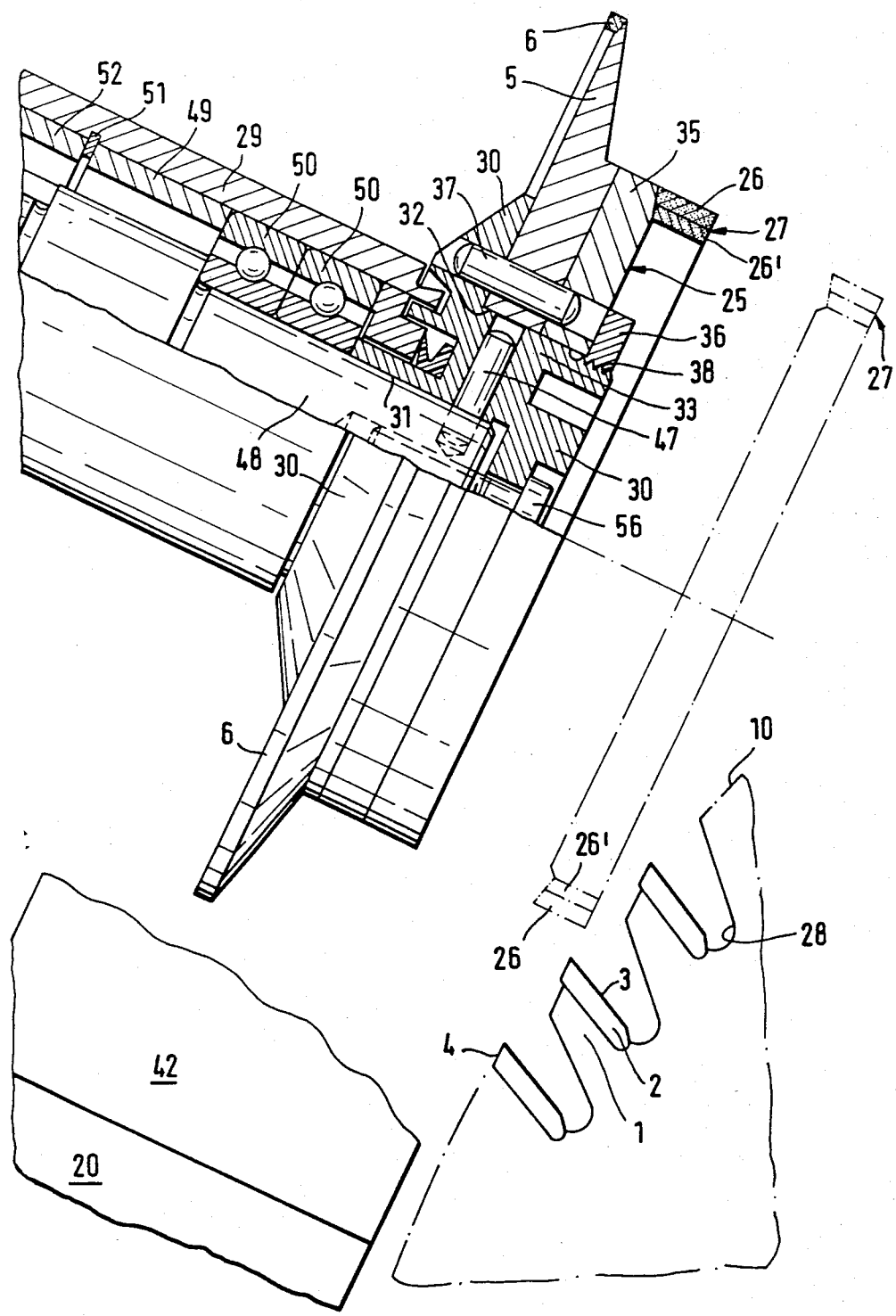
FIG. 2 is a view similar to that shown in FIG. 1, however, illustrating the position of the grinding head pivoted for grinding the back of a tooth, with the grinding position shown in broken lines.

In FIGS. 1 and 2 a portion of a circular saw blade 10 is shown in phantom with teeth 1 shown in full lines and including hard-metal inserts 2. The hard-metal inserts form the surfaces to be ground, that is, a face area extending generally radially of the blade and a part of the back area extending in the circumferential direction. The grinding is performed with a composite wheel made up of a disk wheel 5 for grinding the face areas 3 and a cup wheel 25 for grinding the back areas 4.

As viewed in FIG. 1 the disk wheel 5 has a disk side facing leftward and downwardly and a backside facing rightward and upwardly. The disk side extends substantially perpendicularly of the axis of the composite wheel. The backside, however, has an outer part providing a frusto-conical surface which tapers to the radially outer circumferential edge of the disk wheel toward the disk side. Accordingly, the radially outer axial dimension of the disk wheel is kept to a minimum so that the disk wheel 5 can be engaged within narrow gaps 28 in the circular saw blade 10. On the flat or disk side of the disk wheel, a diamond coating 6 extends around the circumferential edge.

The cup wheel 25 includes a circular disk-shaped metal body 35, preferably formed of aluminum, bearing against the radially inner part of the backside of the disk wheel 5. An abrasive ring forms the grinding surface 27 and is made up of a radially outer ring 26 formed of a relatively coarse grain bonded with plastic and a radially inner ring 26' formed of a finer grain bonded with plastic. The abrasive ring made up of the rings 26, 26' combine together to form the grinding surface 27 extending transversely of the axis of the composite wheel. As can be seen in FIG. 2 the grinding surface 27 grinds the back areas 4 of the teeth.

Figure 3:
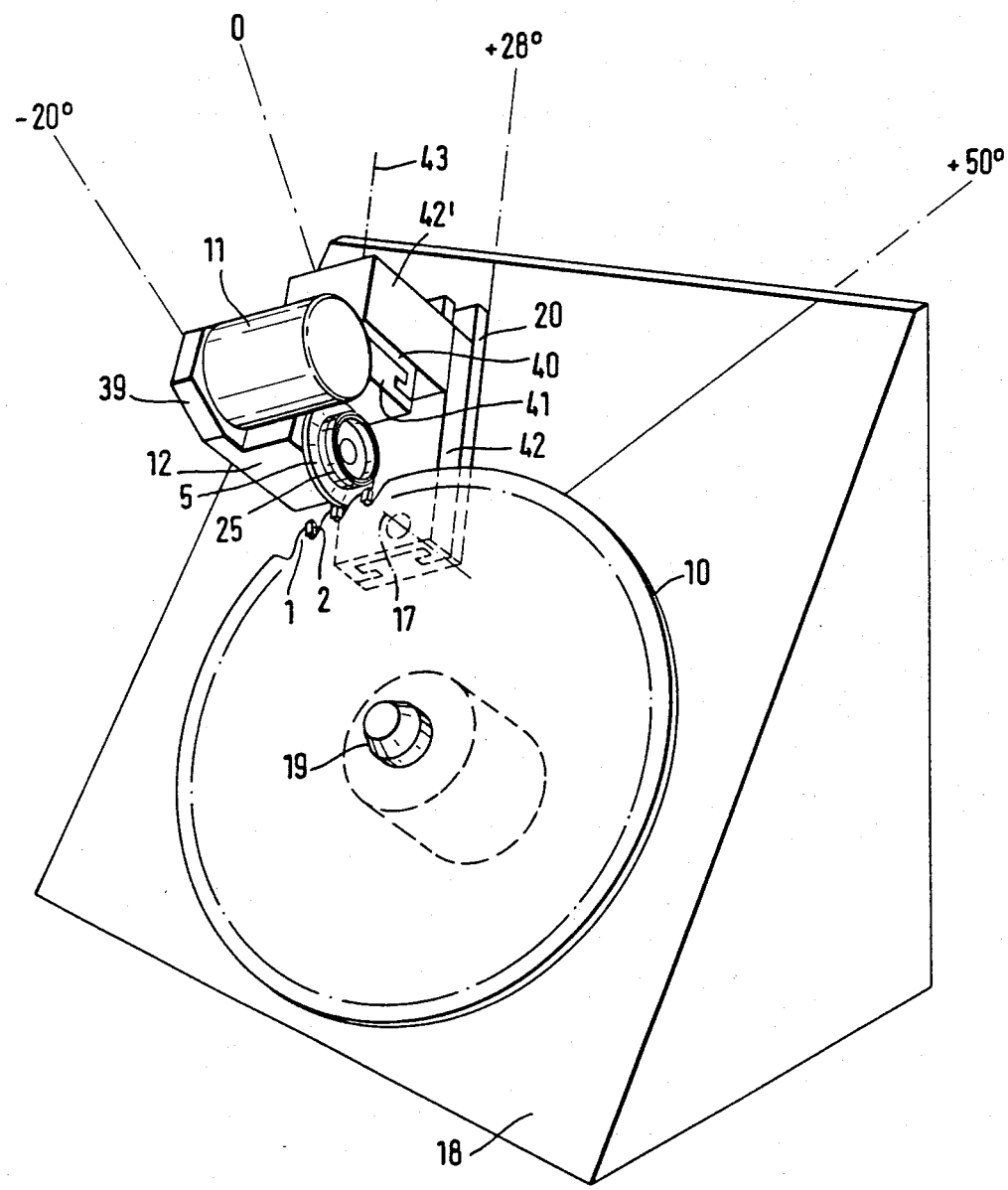
FIG. 3 is a perspective view of a sawtooth grinding machine with a circular saw blade clamped in the inclined position and with the grinding head embodying the present invention positioned for effecting one of the grinding operations.

In FIG. 3, grinding head 12 can be seen including an axially extending spindle made up of an outer spindle sleeve 29 and an inner spindle shaft 48 mounted within the sleeve on ball bearings 50. Intermediate sleeves 49, 52 extend between the bearings located at the front and rear ends of the spindle shaft 48 and the intermediate sleeves are separated by a lock ring 51 inserted into the inside surface of the spindle sleeve 29. As viewed in FIG. 1, the right-hand end of the spindle shaft is its front end. A wheel flange 30 is secured by a bolt 56 to the front end of the spindle shaft and the flange has a central bore 31 which slides over the front end of the spindle shaft. The wheel flange is held to the shaft by a driver pin 47 so that the shaft and flange rotate as a unit. The disk wheel 5 on its disk side bears against an abutment formed by the wheel flange 30. Further, the wheel flange 30 has a collar 33 and the disk wheel 5 has a central bore 32 which fits around the collar. The cup wheel 25 bears against the backside of the disk wheel 5, that is, the opposite side from the disk side by means of an annular aluminum body 35 which has a smaller diameter at its radially outer circumference than the radially outer circumference of the disk wheel 5. A clamping ring 36 is screwed onto a threaded shoulder 38 at the end of the collar 33 of the wheel flange and secures the disk wheel 5 and the cup wheel 25 as a composite wheel on the spindle. The disk wheel 5 and the cup wheel 25 along with the wheel flange 30 are secured against any relative rotation by a locking pin 37 which extends through them in parallel relation with the axis of the spindle shaft 48.

Figure 4:
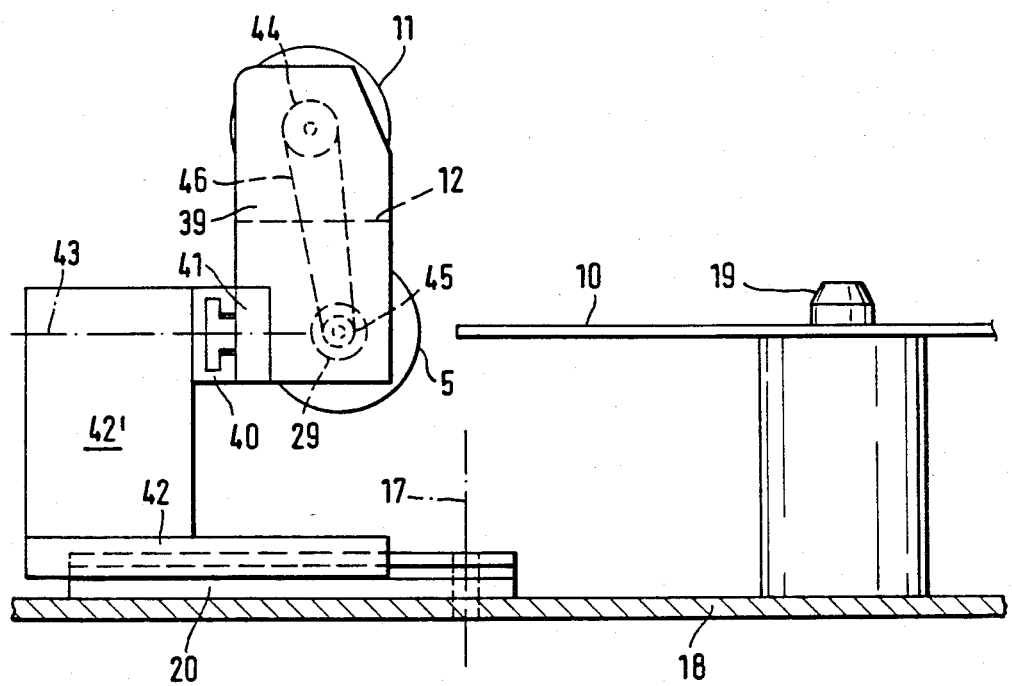
FIG. 4 is a rear view of the arrangement shown in FIG. 3 illustrating the support members for moving the grinding head along different paths arranged parallel to the inclined mounting plate.

As can be seen in FIGS. 1 and 2, the grinding head 12 includes an intermediate housing 39 on which a drive motor 11 is secured so that its axis is parallel to the axis of the spindle shaft 48. In FIG. 4 the intermediate housing 39 is shown enclosing a belt drive formed by a belt 46 trained around an output pulley 44 of the drive motor 11 and a pulley 45 of the spindle sleeve 29.

The grinding head 12 is connected to a cross slide 41 with slideways extending parallel to the spindle shaft 48. Cross slide 41 is displaceable for translatory movement in a cross guide part 40. Cross guide part 40, in turn, is pivotally mounted about an axle 43 which intersects the geometric axis of the spindle shaft 48 at right angles or crosses the spindle shaft at right angles a short distance from it. Pivot axle 43 is located in a housing 42' and is mounted on a main slide 42. The main slide 42 is displaceably guided on a pivot arm 20 which pivots on a mounting plate 18 about an axle 17 with the axle 17 arranged to intersect the axle 43 at right angles or to cross it at right angles a short distance away.

Therefore, pivot arm 20 carries the grinding head 12 and the composite wheel formed by the disk wheel 5 and the cup wheel 25 and the other motion transmitting elements on the main slide 42. The position of the pivot arm determines whether the composite wheel is in position for suitably grinding the face or the back of a tooth. In the arrangement of the machine shown in FIG. 3, the pivot arm 20 can be swung counterclockwise from a neutral position 0 through about −20° and it can be pivoted for effecting face grinding by a rake angle of up to +28° and by resetting the grinding head it can be pivoted to an angle of another +50° for back grinding of a tooth. In other words, the pivot arm can be swung through a total of 98°. Pivot arm 20 is in its neutral position when, viewed in projection onto the mounting plate 18, the geometric axis of the pivot axle 43 is prolonged as a diameter of the circular saw blade, that is, it intersects the geometric axis of the mandrel 19. When the geometric axis of axle 43 intersects the axis of the spindle shaft 48 and of the pivot axle 17 at right angles, the geometric axes of the axles 17, 43 intersect in the grinding center. The grinding center may be considered as the location in which the abrasive coating contacts the surface to be ground. The geometric axis of the spindle shaft 48 lies in the plane of the circular saw blade in the center of the blade thickness.

The pivot arm 20 can be fixed in all of its positions. In the machine illustrated in the drawing, the pivot arm is pivoted by a hydraulic drive and, in addition, the translatory movement of the main slide 42 on the pivot arm 20 can be effected by a hydraulic drive.

Mounting plate 18 is inclined upwardly and backwardly in the fashion of a desk, note FIG. 3, and the pivot axle 17 and the axis of the mandrel 19 extend perpendicularly to the mounting plate. As shown in the drawing, the inclined mounting plate 18 is square and the pivot axle 17 of the pivot arm 20 as well as the axis of the mandrel 19 for the circular saw blade 10 lie along a line extending on the mounting plate disposed at an angle of 45° to the horizontal, so that the pivot arm 20 and the parts mounted on it are located on the upper left-hand corner of the mounting plate as viewed in FIG. 3 and the circular saw blade 10 is located downwardly along a diagonal running to the opposite lower right corner.

While hydraulic drives have been mentioned, they can be replaced by electric servomotors to be controlled by microprocessors.

While specific embodiments of the invention have been shown and described in detail to illustrate the application of the inventive principles, it will be understood that the invention may be embodied otherwise without departing from such principles.

We claim:

1. Sawtooth grinding machine for grinding saw blade teeth, such as teeth with hard metal inserts, including a single grinding head pivotable about a plurality of axes and capable of translatory movement in a plurality of directions, said grinding head arranged to grind both the face and back of a tooth, wherein the improvement comprises an axially extending spindle shaft, a first grinding wheel and a second grinding wheel each suitable for grinding hard metal and mounted on said spindle shaft said first and second grinding wheels being secured together and forming a composite wheel, said first grinding wheel is a disk wheel having a disk side and an oppositely facing backside, said disk side extends perpendicularly of the axis of said spindle shaft, said backside extends transversely of the axis of said spindle shaft and tapers toward said disk side at the radially outer circumference of said disk wheel so that said disk wheel has a minimum thickness in the axial direction of said spindle shaft at the radially outer circumference thereof whereby said disk wheel can be inserted into a narrow tooth gap for grinding the face of a tooth, said disk side having an annular abrasion coating at the radially outer circumference thereof, and said second grinding wheel is a cup wheel for grinding the back of a tooth, the radially outer circumference of said cup wheel has a smaller diameter than the radially outer circumference of said disk wheel and said cup wheel has an abrasive ring located on the radially outer circumference thereof with said abrasive ring located in spaced relation from said disk wheel.

2. Sawtooth grinding machine, as set forth in claim 1, a wheel flange is secured on said spindle shaft so that it rotates with said shaft, said wheel flange has a collar formed thereon extending in the axial direction of said spindle shaft, said disk wheel has a central bore fitted on said collar and said disk side of said disk wheel bears against said wheel flange, said cup wheel has a front side and a backside each extending transversely of the axis of said spindle shaft, the backside of said cup wheel bears against the backside of disk wheel, and a clamping ring engageable with said collar on said wheel flange secures said disk wheel and said cup wheel onto said wheel flange, and means for securing said disk wheel, said cup wheel and said wheel flange against relative rotation.

3. Sawtooth grinding machine, as set forth in claim 2, wherein said cup wheel comprises an annular body encircling said collar forming the backside of said cup wheel and bearing against the backside of said disk wheel, an abrasive ring secured to the opposite side of said body from said disk wheel and extending outwardly from said body in the axial direction of said spindle shaft, said abrasive ring comprises a radially outer ring formed of relatively coarse plastic-bonded grain and a radially inner ring formed of finer plastic-bonded grain, said rings forming a grinding surface extending transversely of the axial direction of said spindle shaft and said grinding surface arranged to grind the back of a tooth.

4. Sawtooth grinding machine, as set forth in claim 1 or 2, wherein intermediate members, supporting said grinding head and said composite wheel for grinding the face and back of a tooth, are arranged for providing translatory movements of said grinding head disposed in two directions extending perpendicularly of one another with one translatory movement direction crossing the axis of said spindle shaft at right angles and the other translatory direction extending parallel to the axis of said spindle shaft, and said intermediate members arranged for effecting pivotal movement about two axes extending perpendicularly to one another and said pivotal axes extending perpendicularly of the axis of said spindle shaft.

5. Sawtooth grinding machine, as set forth in claim 4, comprising a mounting plate, a mandrel mounted in and extending perpendicularly of said mounting plate for supporting a circular saw blade disposed parallel to the surface of said mounting plate, said intermediate members comprising a pivot arm pivotally mounted on said mounting plate about an axis so that the pivot arm can be pivoted parallel to the surface of said mounting plate, said pivot arm can be moved into a plurality of angular positions and can be fixed in said angular positions, a main slide guided on said pivot arm for translatory movement, a housing secured to said main slide, a pivot axle located in said housing and extending parallel to said mounting plate and to said pivot arm, a guide part secured on said housing, a cross slide displaceable in translatory movement perpendicularly of the direction of translatory movement of said main slide, and said grinding head supported on said cross slide with the axis of said spindle shaft extending parallel to the translatory movement direction of said cross slide.

6. Sawtooth grinding machine, as set forth in claim 5, wherein said pivot arm is pivotally displaceable through an angular range of approximately 100°.

7. Sawtooth grinding machine, as set forth in claim 6, wherein a hydraulic drive is arranged for effecting the pivotal movement of said pivot arm through its range of angular movement so that in one end position the face of a tooth can be ground by said disk wheel and in the second end position the back of a tooth can be ground by said cup wheel, and a control console for electronically controlling said hydraulic drive.

8. Sawtooth grinding machine, as set forth in claim 5, wherein said mounting plate has a mounting surface extending upwardly from the horizontal and inclined backwardly in a desk-like manner, and said pivot arm supporting said grinding head by way of said intermediate members has its axle extending perpendicularly to the mounting surface of said mounting plate, and a mandrel for mounting a circular saw blade on said mounting plate extending perpendicularly to said mounting surface of said mounting plate and disposed in parallel relation with said pivot axle of said pivot arm.

9. Sawtooth grinding machine, as set forth in claim 8, wherein said inclined mounting plate is rectangular, the pivot axis of said pivot arm and the axis of said mandrel lie along a line extending across said mounting plate at an angle of 45° to the horizontal, said pivot arm and said intermediate members mounting said grinding head are located in an upper corner of said mounting plate with said mandrel located downwardly therefrom in the direction of the diagonally opposite lower corner.

* * * * *